US012397522B2

(12) United States Patent  
Bardin

(10) Patent No.: US 12,397,522 B2  
(45) Date of Patent: Aug. 26, 2025

(54) CURING MOLD FOR A TIRE, COMPRISING MEANS FOR CUTTING A RUBBER MOLD SEAM

(71) Applicant: COMPAGNIE GENERALE DES ETABLISSEMENTS MICHELIN, Clermont-Ferrand (FR)

(72) Inventor: Damien Bardin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 379 days.

(21) Appl. No.: 18/021,853

(22) PCT Filed: Aug. 16, 2021

(86) PCT No.: PCT/FR2021/051468  
§ 371 (c)(1),  
(2) Date: Feb. 17, 2023

(87) PCT Pub. No.: WO2022/038328  
PCT Pub. Date: Feb. 24, 2022

(65) Prior Publication Data  
US 2023/0356489 A1 Nov. 9, 2023

(30) Foreign Application Priority Data

Aug. 19, 2020 (FR) ........................ 2008560

(51) Int. Cl.  
*B29D 30/06* (2006.01)  
*B29C 37/00* (2006.01)  
(Continued)

(52) U.S. Cl.  
CPC .......... *B29D 30/0606* (2013.01); *B29C 37/00* (2013.01); *B29D 30/0681* (2013.01);  
(Continued)

(58) Field of Classification Search  
None  
See application file for complete search history.

(56) References Cited

U.S. PATENT DOCUMENTS 3,666,852 A * 5/1972 Burke ................. B29C 70/84  
29/527.1  
6,318,983 B1 11/2001 Lopez et al.  
(Continued)

FOREIGN PATENT DOCUMENTS

DE 19506697 A1 8/1996  
DE 102018213083 A1 2/2020  
(Continued)

OTHER PUBLICATIONS

Yonezu. JP2019181848A. 2019. ESpaceNet Machine Translation. (Year: 2025).*  
(Continued)

*Primary Examiner* — Galen H Hauth  
*Assistant Examiner* — Alexander D Booth  
(74) *Attorney, Agent, or Firm* — VENABLE LLP

(57) ABSTRACT

A curing mold (10) for a tire comprises: a plurality of circumferentially distributed sectors (18) that are intended to mold the tread of the tire, at least one sipe blade (40) intended to mold a void in the tread, the sipe blade extending over two adjacent sectors (18) such that the sipe blade comprises a part (40a, 40b) in each of the two sectors, the two parts of the sipe blade being separated, in the closed position of the mold, by a space (26) that creates flash during the curing of a tire, the parts of the sipe blade comprising cutting means (38) that are able to cut off the flash during the opening of the mold.

11 Claims, 1 Drawing Sheet

(51) Int. Cl.
*B29D 30/68* (2006.01)
*B29L 30/00* (2006.01)

(52) U.S. Cl.
CPC ...... *B29D 30/68* (2013.01); *B29C 2793/0054* (2013.01); *B29D 2030/0613* (2013.01); *B29L 2030/006* (2013.01)

(56) References Cited

U.S. PATENT DOCUMENTS

| | | |
|---|---|---|
| 9,415,555 B2 | 8/2016 | Ohashi |
| 10,525,532 B2 | 1/2020 | Desvignes et al. |
| 11,358,357 B2 | 6/2022 | Gueugneau et al. |
| 2007/0284783 A1 | 12/2007 | Ohara |
| 2015/0165706 A1* | 6/2015 | Gaebelein ......... B29D 30/0629 264/293 |
| 2016/0129651 A1 | 5/2016 | Ohashi |
| 2017/0216922 A1 | 8/2017 | Desvignes et al. |
| 2018/0065332 A1 | 3/2018 | Kaneko |
| 2019/0184659 A1 | 6/2019 | Gueugneau et al. |
| 2023/0166468 A1 | 6/2023 | Bardin et al. |
| 2023/0347608 A1 | 11/2023 | Bardin et al. |

FOREIGN PATENT DOCUMENTS

| | | | |
|---|---|---|---|
| EP | 579436 A1 * | 1/1994 | ......... B29D 30/0606 |
| EP | 2813354 A1 | 12/2014 | |
| EP | 3263307 A1 | 1/2018 | |
| FR | 3024059 A1 | 1/2016 | |
| JP | 3-279006 A | 12/1991 | |
| JP | 10-264271 A | 10/1998 | |
| JP | 2019181848 A * | 10/2019 | |
| KR | 20-0408355 Y1 | 2/2006 | |
| WO | 2017/221283 A1 | 12/2017 | |

OTHER PUBLICATIONS

International Search Report dated Nov. 18, 2021, in corresponding PCT/FR2021/051468 (6 pages).

* cited by examiner

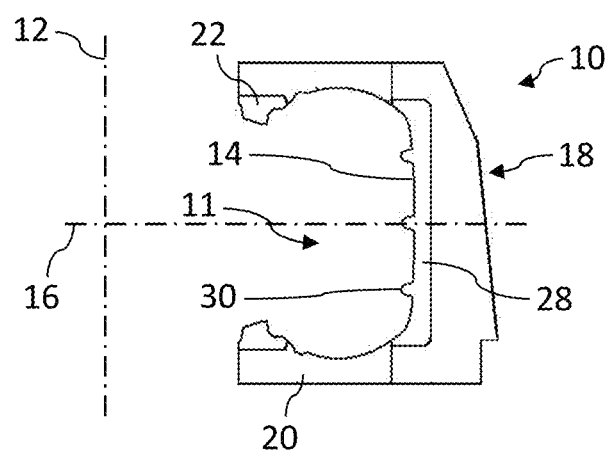
Fig. 1
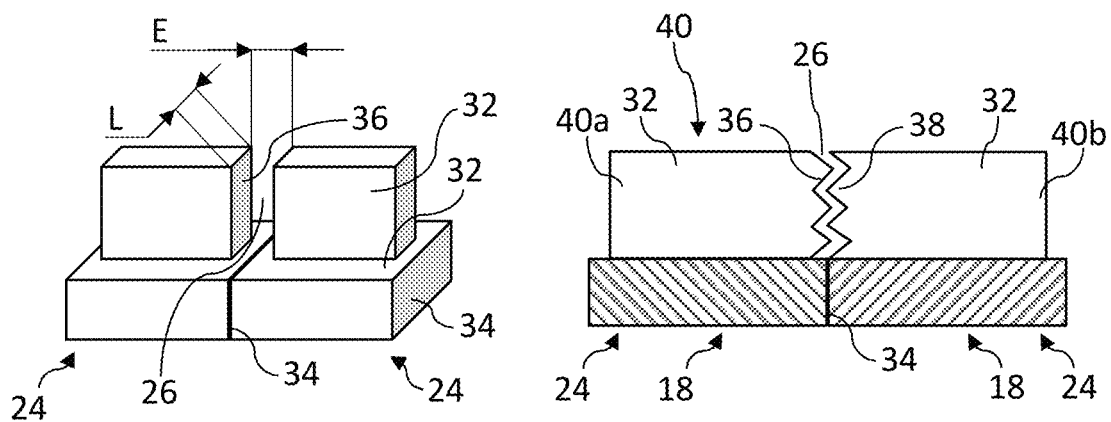
Fig. 2  Fig. 3

CURING MOLD FOR A TIRE, COMPRISING MEANS FOR CUTTING A RUBBER MOLD SEAM

BACKGROUND

The invention lies in the field of tyre manufacturing and relates more particularly to a mould for curing a tyre, having means for cutting off rubber flash.

The manufacture of a tyre comprises a curing step during which a green tyre is moulded and vulcanized so as to give the tyre its characteristics and its final appearance. A tyre is cured in a curing mould. The mould comprises a plurality of moulding elements which form, in the closed position of the mould, an internal moulding surface corresponding to the negative of the external surface of the tyre. In particular, the mould comprises a plurality of sectors that are distributed circumferentially with respect to the axis of the mould and are intended to mould the tread of the tyre, and two shells that are disposed axially and are intended to mould the sidewalls of the tyre.

During curing, a rubber-based green tyre is pressed against the internal moulding surface. At the same time, the moulding elements are kept in contact with one another by closing means in order to prevent the mould from opening under the effect of the pressure exerted by the green tyre against the internal moulding surface. Thus, during curing, the mould remains closed and the rubber under pressure does not creep between the moulding elements. However, it is possible for certain moulding elements to be separated by a very narrow space, resulting, for example, from the wearing of the contact surfaces between said moulding elements, or from a design choice relating to the need to evacuate the air trapped between the green tyre and the mould. The rubber under pressure is then able to creep into said space and to form, on the tyre, flash which may have a detrimental effect on its characteristics and on its final appearance.

The application US2007284783A1 describes a mould in which each sector has, on its circumferential edges, a contact surface that comes to bear on the contact surface of the adjacent sector, and a surface slightly set back circumferentially and referred to as a "non-contact" surface, which is disposed radially towards the inside of the mould and has a roughness of between 50 and 200 μm. During curing, the non-contact surfaces of two adjacent sectors move towards one another under the effect of their thermal expansion so as to come to bear against one another. Thus, the mould does not allow the rubber under pressure to creep between the sectors, while allowing the evacuation of the air by virtue of the roughness of the non-contact surfaces.

However, the wearing of the contact surfaces between the sectors has the consequence of the non-contact surfaces getting closer together and the contact pressure between the non-contact surfaces increasing when they come into contact under the effect of the thermal expansion of the sectors, said pressure being able to bring about premature deterioration of the roughness of the non-contact surfaces by burnishing. By contrast, when the mould is no longer capable of compensating for the increasing closeness of the contact surfaces between the sectors on account of their wear, the formation of a space between the contact and non-contact surfaces is observed, said space being able to bring about the creation of flash.

An objective of the invention is to overcome the drawbacks of the prior art and to provide an original solution in order to improve the characteristics and final appearance of the tyres, while avoiding premature deterioration of the moulding elements.

SUMMARY

This objective has been achieved by the invention, which proposes, according to a first subject, a mould for curing a tyre, comprising at least two moulding elements, said moulding elements being separated, in the closed position of the mould, by a space that creates flash during the curing of a tyre, characterized in that said moulding elements comprise cutting means that are able to cut off said flash during the opening of the mould.

In other words, it is preferable to maintain a very narrow space between certain moulding elements, even taking into account their thermal expansion, in order to avoid the deterioration of said moulding elements.

In addition, during the opening of the mould, said moulding elements move away from the tyre along given trajectories. The cutting means of said moulding elements then cut off the flash created between the two moulding elements. The flash is cut off, torn off, or cracked so as to allow it to be eliminated during the running of the tyre, which then rapidly achieves characteristics and an appearance that are satisfactory.

Advantageously, each of said moulding elements comprises an edge partially delimiting the space that separates them in the closed position, the cutting means being arranged on the edge of at least one of said moulding elements such that the cutting means cut off said flash during their withdrawal from the tyre, each of said moulding elements being able to be withdrawn during the opening of the mould. Such an arrangement of the cutting means is simple and makes it possible to cut off the flash effectively.

Preferably, the cutting means are arranged on said edge of each of said moulding elements, the cutting means of each of said moulding elements having complementary shapes. Such shapes make it possible to improve the effectiveness of the cutting off of the flash.

Advantageously, the cutting means are integral with the edge of at least one of said moulding elements. Such a design is simple and allows time to be saved during the manufacture of the moulding elements.

Preferably, the cutting means have a recessed and/or protruding shape. Such a non-rectilinear shape makes it possible to extend the parts of the cutting means in contact with the flash and, consequently, to increase the effectiveness of the cutting off of the flash.

FIG. 2 illustrates said space 36, which, advantageously, has a length L of between 0.2 and 20 mm and, more preferably, between 0.5 and 5 mm. Preferably, said space 36 has a thickness E of between 0.1 and 3 mm, more preferably between 0.2 and 2 mm, and even more preferably between 0.3 and 1 mm.

Such a space with restricted dimensions means having moulding elements that likewise have restricted dimensions and consequently are fragile. Such dimensioning of the moulding elements makes the implementation of the invention particularly advantageous.

Preferably, the mould comprises:
- a plurality of circumferentially distributed sectors that are intended to mould the tread of said tyre,
- at least one sipe blade intended to mould a void in said tread, said sipe blade extending over two adjacent sectors such that said sipe blade comprises a part in each of the two sectors, said moulding elements taking the shape of each part of the sipe blade. The sipe blade has a thickness of between 0.2 and 20 mm and, more preferably, between 0.5 and 5 mm. In the same way, such an arrangement and such dimensioning of the moulding elements make the implementation of the invention particularly advantageous.

Preferably, the cutting means have the shape of a triangular or crenellated toothing. Such a shape makes it possible to improve the effectiveness of the cutting off of the flash.

Advantageously, the cutting means are obtained by way of a process of consolidation by selective melting. The use of such a process, which is also employed in the manufacture of the moulding elements on which the cutting means are arranged, makes it possible to reduce the manufacturing cost and duration for the cutting means.

A second subject of the invention is a method for manufacturing a tyre, comprising a step of curing a tyre in a curing mould according to the first subject of the invention.

Lastly, a third subject of the invention is a tyre intended to be mounted on the rim of a wheel, the tyre being obtained by a manufacturing method according to the second subject of the invention.

BRIEF DESCRIPTION OF THE FIGURES

The invention will be understood better from the rest of the description, which is based on the following figures:

FIG. 1 is a schematic depiction of a curing mould according to the prior art;

FIG. 2, described above, is a schematic depiction of certain elements of the mould in FIG. 1;

FIG. 3 is a schematic depiction of certain elements of a curing mould according to a preferred embodiment of the invention.

DETAILED DESCRIPTION

In the various figures, elements that are identical or similar bear the same reference signs. Their description is therefore not systematically repeated.

FIG. 1 illustrates a schematic depiction of a curing mould 10 for moulding and curing a green tyre, in order to obtain a tyre with desired characteristics and a desired appearance. The mould delimits a cavity 11 that is generally rotationally symmetric about a central axis 12. The mould comprises a frame, moulding elements, curing means, and means for opening and closing the mould. The opening and closing means are able to set the moulding elements in movement between an open position and a closed position. The open position corresponds to the step of withdrawing a moulded and vulcanized tyre, and to the step of introducing a new green tyre. The closed position (FIG. 1) corresponds to the step of moulding and curing the green tyre. In the closed position of the mould, the moulding elements form an internal moulding surface 14 corresponding to the negative of the desired external surface of the tyre. The curing means are able to provide the thermal energy and/or the pressure that are required, respectively, for the curing and/or the pressing of the green tyre against the internal moulding surface 14. By way of example, thermal energy and pressure are provided by pressurized steam circulating about the mould, and inside the green tyre in an extendable membrane.

Throughout the following text and unless indicated to the contrary, an axial direction denotes a direction parallel to the central axis 12, a radial direction 16 denotes a direction perpendicular to and intersecting the central axis 12, and a circumferential direction denotes a direction perpendicular to a radial direction 16 and to the central axis 12.

The mould 10 more particularly comprises a plurality of sectors 18 intended to mould the tread of the tyre, two shells 20 intended to mould the sidewalls of the tyre, and two rings 22 intended to mould the beads of the tyre. In the closed position of the mould, the sectors 18 are distributed circumferentially with respect to the central axis 12 of the mould so as to form a ring, and are able to be withdrawn radially with respect to the tyre during the opening of the mould.

FIG. 2 illustrates certain elements of the mould 10, which comprises at least two adjacent moulding elements 24, said moulding elements being separated, in the closed position of the mould, by a space 26 that creates flash (not shown) during the curing of a tyre. By way of example, the two moulding elements 26 may be two sectors 18, a sector 18 and a shell 20, or two elements that are used in the composition of one or more sectors, such as lining elements 28, sipe blades 30 intended to mould grooves in the tread of the tyre, or sipe blades intended to mould voids in said tread. Each of said moulding elements 24 comprises a plurality of faces having the various functionalities. In particular, a moulding element comprises a moulding surface 32 contributing to the internal moulding surface 14 of the mould, a plurality of contact surfaces 34 or interfaces with adjacent moulding elements, and at least one edge 36 partially delimiting the space 26 that creates the flash. By way of example, the presence of said space 26 results from a design choice intended to avoid impacts between fragile parts of the two moulding elements 24, said moulding elements coming into contact strongly via their contact surfaces 34 during the closure of the mould.

FIG. 3 illustrates said moulding elements 24, which comprise, according to the invention, cutting means 38 that are able to cut off said flash during the opening of the mould. During the opening of the mould, said moulding elements move away from the tyre along given trajectories. The cutting means of said moulding elements then cut off the flash created between the two moulding elements. The cutting means are arranged on the edge 36 of at least one of said moulding elements 24 such that said flash slides along the cutting means as they are withdrawn.

The cutting means have a recessed and/or protruding shape. The recesses and the protrusions of the cutting means make it possible to lengthen the sliding path of the flash along the cutting means as they are withdrawn. By way of examples, the cutting means take the form of scissors, blades, spikes or any other suitable shape for cutting, tearing or forming an incipient crack in the flash.

Preferably, the cutting means are arranged on the edge 36 of each of said moulding elements 24, the cutting means of each of said moulding elements having complementary shapes. Thus, the effectiveness of the cutting off of the flash by the cutting means is improved. The cutting means 38 are integral with the edge 36 of at least one of said moulding elements 24. By way of example, the cutting means may also be fixed to the edges 36 of the moulding elements 24 by any other suitable means.

Said space 26 has a length L of between 0.2 and 20 mm and, more preferably, between 0.5 and 5 mm. The length of said space denotes, in a circumferential plane, the longest distance along which the two moulding elements are edge-to-edge. Thus, it is particularly appropriate to provide a space 26 and cutting means 38 on the edges of moulding elements 24, the contact surface of which has a short extent and is, consequently, more fragile.

Said space has a thickness E of between 0.1 and 3 mm, more preferably between 0.2 and 2 mm, and even more preferably between 0.3 and 1 mm. The thickness of said space denotes, in a circumferential plane, the shortest distance separating the two moulding elements. It is necessary for the moulding elements to be sufficiently far apart to prevent any risk of impact therebetween and sufficiently close together to minimize the thickness of the flash and thus to make it easier to cut off.

According to a preferred embodiment, the mould comprises at least one sipe blade 40 that extends over two adjacent sectors 18 such that said sipe blade comprises a part in each of the two sectors. In other words, said sipe blade comprises two parts 40a, 40b, said moulding elements 24 taking the form of each part of the sipe blade and, optionally, of the sector 18 to which a sipe blade part is joined. It is particularly appropriate to provide a space 26 and cutting means 38 on the particularly fragile edges of a "sectored" sipe blade. The sipe blade has a thickness of between 0.2 and 20 mm and, more preferably, between 0.5 and 5 mm.

Preferably, the cutting means have the shape of a triangular or crenellated toothing. Such a shape is particularly easy to arrange on the edge 36 of a sipe blade 40.

The different moulding elements 24 and the cutting means 38 that are used in the composition of a mould 10 are made from alloys of steel, aluminium, polymer resin or some other rigid material suitable for such a use.

The different moulding elements 24 and the cutting means 38 are obtained using a process chosen from the following group of processes: casting, pressing, laser cutting lasering, electrical discharge machining or consolidation by selective melting.

"Selective consolidation by melting" is understood to be an additive manufacturing process intended to aggregate or agglomerate a feed of incoming work material progressively and selectively so as to obtain an outgoing work material. The incoming work material takes the form of and/or is used in the composition of a powder, of a wire or of a solution/bath. The incoming work material is generally introduced by depositing a powder on a support such as to form a layer. The support takes the form of a plate or a previously agglomerated layer. The agglomeration is generally achieved by solidification of the incoming work material, which is melted completely or partially (sintering) by localized or generalized input of energy, and then cooled. The input of energy is generally realized by a laser or an electron beam, although it can be realized by infrared radiation or induction. In the case of the laser and the electron beam, the localization of the input of energy is achieved by means for orienting the input of energy, such as optical or electromagnetic means, respectively. The process provides the incoming work material with a shape and mechanical characteristics that are predetermined. Said shape and said characteristics depend on the material of the incoming work material and on parameters of the process. Said shape is generally a one-piece solid, although it can be made up of a plurality of one-piece solids.

Further variants and embodiments of the invention may be envisaged without departing from the scope of these claims.

The invention claimed is:

1. A tire curing mold comprising:
   a plurality of circumferentially distributed sectors that are intended to mold a tread of a tire; and
   at least one sipe blade intended to mold a void in the tread, the sipe blade extending over two adjacent sectors such that the sipe blade comprises a part in each of the two sectors,
   the two parts of the sipe blade being separated, in a closed position of the mold, by a space that creates flash during curing of the tire, the two parts of the sipe blade comprising cutting means that are able to cut off the flash during opening of the mold.

2. The tire curing mold according to claim 1, wherein each of the parts of the sipe blade comprises an edge partially delimiting the space, the cutting means being arranged on the edge of at least one of the parts of the sipe blade such that the cutting means cut off the flash during withdrawal from the tire, each of the parts of the sipe blade being able to be withdrawn during the opening of the mold.

3. The tire curing mold according to claim 2, wherein the cutting means are arranged on the edge of each of the parts of the sipe blade, the cutting means of each of the parts of the sipe blade having complementary shapes.

4. The tire curing mold according to claim 2, wherein the cutting means are integral with the edge of at least one of the parts of the sipe blade.

5. The tire curing mold according to claim 1, wherein the cutting means have a recessed and/or protruding shape.

6. The tire curing mold according to claim 1, wherein the space has a length of between 0.2 and 20 mm.

7. The tire curing mold according to claim 1, wherein the space has a thickness of between 0.1 and 3 mm.

8. The tire curing mold according to claim 1, wherein the sipe blade has a thickness of between 0.2 and 20 mm.

9. The tire curing mold according to claim 1, wherein the cutting means have the shape of a triangular or crenellated toothing.

10. The tire curing mold according to claim 1, wherein the cutting means are obtained by way of a process of consolidation by selective melting.

11. A method for manufacturing a tire comprising a step of curing the tire in the tire curing mold according to claim 1.

* * * * *